Patented Sept. 6, 1949

2,481,300

UNITED STATES PATENT OFFICE 2,481,300

PROCESS FOR PURIFYING HYDROCARBONS

Willem Frederik Engel, Amsterdam, Netherlands, assignor to Shell Development Company, San Francisco, Calif., a corporation of Delaware No Drawing. Application June 2, 1947, Serial No. 751,948. In the Netherlands August 10, 1943

Section 1, Public Law 690, August 8, 1946
Patent expires August 10, 1963

7 Claims. (Cl. 196—36)

This invention relates to the purification of hydrocarbons and relates more particularly to the separation of organically combined halogen and/or sulfur from hydrocarbons comprising normally liquid hydrocarbons in the motor fuel boiling range.

Hydrocarbons of natural or synthetic origin as generally available are often contaminated by the presence therein of impurities in substantial amounts, the removal of which is essential before such hydrocarbons can be efficiently employed in many fields of application such as, for example, motor fuels, solvents, intermediate or starting materials in processes converting them to valuable derivatives, etc. These impurities comprise, for example, sulfur and halogen, as such, or in organically combined form, and they may be of natural origin or have been introduced into the hydrocarbons during a chemical treating or processing operation. Processes available heretofore enabling the removal to at least a substantial degree of such impurities from hydrocarbons containing them are often handicapped by the need for operative steps the complexity of which and/or the expense of the apparatus thereby necessitated, often renders such processes impractical as a source of hydrocarbons of a sufficient degree of purity. Many other purifying processes, although of a less complex nature, generally employ catalytic materials which, because of such factors as their relatively high initial cost, short useful life, difficulty with which they are reactivated, and the like, render their use impractical. Still other treating methods are handicapped by the additional operative steps they occasion. Thus purification steps requiring the use of water, whether in the form of a liquid or steam, generally necessitate the use of additional water separating steps and/or dehydrating steps which often militate against the practicability of the process. A particularly disadvantageous feature of many less costly processes available heretofore is their inability to effect any substantial removal of the contaminants without also altering to a material extent the composition of the hydrocarbon materials treated. This is generally particularly so when the halogen and/or sulfur contaminants are present in organically combined form, such as in the form of cyclic sulfur compounds containing sulfur in the ring, as thiophene, or in the form of aromatic chlorine compounds, as chlorotoluene and the like.

A prerequisite to especial suitability of a process effecting efficient removal of the contaminants from a hydrocarbon, a hydrocarbon fraction, or a hydrocarbon mixture, the composition of which has been adjusted in conformity with requirements prescribed by the operating conditions of the process in which it is to be employed as a starting material, is the ability to avoid not only any substantial alteration in the chemical composition, but also any material alteration in the percentage composition of the material treated.

It is an object of the present invention to provide an improved process enabling the more efficient purification of hydrocarbons without effecting any substantial alteration in the composition thereof.

Another object of the present invention is the provision of an improved process enabling the more efficient removal of impurities comprising halogen and/or sulfur from normally liquid hydrocarbon materials without effecting any substantial alteration in the composition of the material treated.

Another object of the invention is the provision of an improved process enabling the more efficient removal of contaminating amounts of organically combined chlorine and/or sulfur from normally liquid hydrocarbons in the motor fuel boiling range without altering to any substantial degree the composition of the hydrocarbons treated.

A still further object of the invention is the provision of an improved process enabling the more efficient removal of organically combined chlorine from straight run and cracked gasolines without any substantial alteration in the composition of the gasoline treated.

Still another object of the invention is the provision of an improved process enabling the more efficient removal of organically combined sulfur from straight run and cracked gasolines without effecting any substantial change in the composition of the gasoline treated. Other objects and advantages of the invention will become apparent from the following detailed description thereof.

It has now been found that contaminating amounts of impurities comprising halogen and/or sulfur, such as, for example, organically combined halogen and/or sulfur, are removed substantially completely from hydrocarbons, such as, for example the normally liquid hydrocarbons in the motor fuel boiling range, without bringing about any substantial alteration in the chemical or physical composition of the hydrocarbon treated, by contacting the hydrocarbons comprising such contaminants under substantially anhydrous conditions with a catalyst comprising active carbon in combination with an alkaline compound of an alkali and/or alkaline earth metal at a temperature in excess of about 250° C., but below the temperature at which any substantial decomposition and/or reaction of the components of the hydrocarbon charge treated, other than the contaminants, are encountered.

The sulfur- and/or halogen-containing hydrocarbons treated in accordance with the invention may be obtained from any suitable source. Thus they include single hydrocarbons, as well as mixtures thereof, of natural or synthetic origin. They include, for example, the normally liquid hydrocarbons obtained by such processes as simple distillation, pyrogenic or catalytic treatment, and the like, of naturally occurring or synthetically prepared hydrocarbon mixtures. They comprise the sulfur- and/or halogen-contaminated hydrocarbon products obtained in such processes as, for example, hydrogenation, dehydrogenation, polymerization, isomerization, alkylation, reforming, cracking, hydroforming, etc. The process of the invention is applied with particular advantage to the removal of sulfur-containing impurities from normally liquid hydrocarbons in the motor fuel boiling range such as, for example, straight run gasoline, catalytically cracked gasoline, thermally cracked gasoline, and the like. A further particularly valuable application of the invention resides in its utilization to effect the removal of halogen, for example, chlorine, particularly organically combined chlorine, from normally liquid hydrocarbons such as the hydrocarbon products obtained in many of the catalytic processes, such as, isomerization, alkylation and other processes wherein a hydrogen halide or a metal halide catalyst is brought into contact with the hydrocarbons undergoing conversion.

Diluent gases such as, for example, hydrogen, nitrogen, methane, and the like, may be comprised in lesser amounts in the hydrocarbon charge to the system. Materials consisting essentially of only such normally gaseous materials of relatively high thermal stability are, however, freed of halogen and/or sulfur containing contaminants under the conditions prescribed and claimed in co-pending application Serial No. 743,187, filed April 22, 1947.

The process of the invention may be applied with advantage to the further purification of hydrocarbons which have been subjected to a partial desulfurization treatment in which only the more readily removable sulfur-containing impurities such as hydrogen sulfide and mercaptans are removed, to effect the separation therefrom of at least a substantial part of the remaining sulfur-containing impurities. If desired the hydrocarbon charge to the system may be subjected to an initial less effective desulfurization treatment, such as, for example, a treatment comprising one or more such steps as contact with aqueous caustic, passage through an adsorbent, or the like, before introduction into the system.

The efficiency and relatively low cost of the process renders its use particularly effective in the purification of hydrocarbons to be used as charge or diluent material, etc., in such processes as hydrogenation, dehydrogenation and the like in which catalysts are employed which are adversely effected by contact with even relatively small amounts of a halogen- or sulfur-containing impurity. Examples of such catalysts are those comprising a metal such as nickel, iron, cobalt, chrominum, palladium and the like as active component.

The process of the invention is executed in the presence of a catalyst comprising adsorptive carbon and an alkaline compound of an alkali and/or alkaline earth metal. Attainment of the objects of the invention necessitates the utilization in combination with one another of both components. The active carbon component of the catalyst may consist of any suitable carbon having an extended surface area. Particularly preferred active carbons are the highly adsorptive carbons possessing a suitable hardness. The active carbons are not limited to those of any particular source and comprise, for example, activated vegetable or animal charcoals such as the cocoanut charcoals, wood charcoals, peach pit charcoals, bone-charcoal, etc., as prepared and activated by various commercial suppliers. The charcoal may be further activated prior to, or during, preparation of the combination catalyst by such treatment as subjection to steam or mineral acids, etc.

Suitable alkaline compounds employed in combination with the active carbon comprise the alkaline compounds of the alkali and/or alkaline earth metals, such as, for example, the oxides, hydroxides, carbonates, and bicarbonates of one or more of the following: sodium, potassium, calcium, barium, strontium, lithium, rubidium and cesium. Of these compounds the oxides, hydroxides and carbonates of sodium, potassium and calcium are somewhat preferred. Particularly preferred catalysts comprise active carbon in combination with an alkali metal hydroxide, such as potassium hydroxide and/or sodium hydroxide.

The combination catalysts may be employed in the form of a simple mechanical mixture of the alkaline compound and the active carbon as obtained, for example, by mixing the carbon with the alkaline compound in the form of powder, pellets, chunks, pieces or the like. It is preferred, however, to adsorb at least a substantial amount of the alkaline compound into the surface of the active carbon. Such preferred catalysts may be obtained by formation of the alkaline compound upon the active carbon and subsequently heating the combination at an elevated temperature, or by adding the alkaline compound in finely divided form to the active carbon under conditions conducive to penetration of the pores of the active carbon. Such adsorption in the dry state may be brought about, for example, by the addition of the finely divided alkaline compound to the carbon while under reduced pressure and thereafter raising the pressure. It is to be stressed, however, that the invention is in no wise limited by the manner in which the active carbon is combined with the alkaline compound. The ratio of carbon to alkaline compound in the combination catalysts employed may vary widely within the scope of the invention. In general, it is preferred to employ a catalyst mixture containing a greater amount, by weight of active carbon than alkaline compound admixed therewith. Suitable catalysts, however, comprise, for example, mixtures of active carbon and alkaline compounds of the above-defined class which contain from about 5 to about 40% and preferably from about 10 to about 30% by weight of the carbon of alkali and/or alkaline earth metal, in the form of the alkaline compound, or compounds.

Separation of impurities comprising halogen and/or sulfur from hydrocarbons in accordance with the invention is effected by contacting the contaminated hydrocarbons with the catalyst in the vapor phase at a temperature above about 250° C. The maximum permissible temperature will vary to some extent with the particular hydrocarbons treated and the amount and nature of the impurities present. However, the operating temperature is at all times maintained below the temperature at which any substantial decomposition of the hydrocarbons is encountered. In general the utilization of a temperature in the range of from about 250° C. to about 475° C. has been found satisfactory. Temperatures above about 475° C. will generally result in substantial decomposition of the hydrocarbons treated, whereas temperatures below about 250° C. will generally require the use of such prolonged contact times as to render the process highly impractical. The use of temperatures in the range of from about 300° C. to about 450° C. are somewhat preferred. Still more preferred is the temperature range of from about 350° C. to about 425° C. Atmospheric, superatmospheric or subatmospheric pressure may be employed in executing the purification.

The rate of throughput will vary to some extent within the scope of the invention with the nature of the impurities, the amount thereof present in the hydrocarbons treated, and the operating conditions employed. Throughput rates in the range of from about 0.1 to about 1 kg. of hydrocarbons per liter of catalyst per hour are satisfactory. In general it is found that subjection of the hydrocarbons to more than one passage through the reaction zone is not required since a reduction of the sulfur content of hydrocarbons from 0.25 per cent to as low as 0.001 per cent is readily obtained in single pass operation. Subjection of the hydrocarbon to two or more consecutive contacts with the prescribed catalysts under the above-defined conditions is, however, comprised within the scope of the invention.

The hydrocarbons may be contacted with the combination catalysts in any suitable type of reactor, or series of reactors, enabling intimate contact of the hydrocarbons with the catalysts. Reaction zones wherein the catalyst is in the form of a fixed bed, moving bed, or a fluidized or suspended mass, while in contact with the hydrocarbons undergoing treatment may be employed.

It has been found that under the above-defined conditions, impurities comprising halogen and/or sulfur are removed efficiently from the hydrocarbons comprising them as contaminants. Efficient removal of the impurities, even when present in organically combined form such as, for example, in the form of aromatic halogen, as chlorbenzene; or in the form of cyclic sulfur compounds, as thiophene, is attained. It is to be stressed that removal of the impurities with such a degree of efficiency is in no wise obtained by the use of either the active carbon or the alkaline compounds alone. The effect of the combination catalyst is in no wise an additive effect. The resulting purified hydrocarbons are free of any substantial amount of halogen and/or sulfur contaminants and in general will need no further sulfur or halogen removal treatment; impurities comprising halogen and/or sulfur being retained in the catalyst mass. Without intending to limit the scope of the invention by any theory advanced herein to set forth more fully the nature of the invention, it is believed that the compounds comprising the organically combined halogen and/or sulfur are decomposed during the purifying operation and the resulting halogen and/or sulfur decomposition products retained by the catalyst components by reaction and/or adsorption therewith.

The impurities retained by the catalyst are readily removed therefrom by steaming at an elevated temperature, for example, at a temperature in the range of from about 400° C. to about 500° C. In a preferred method of operation at least two reactors are employed. At least one reactor is employed in the hydrocarbon purification operation while removal of halogen and/or sulfur, for example by steaming, from used catalyst is effected in at least one other reactor. In such wise efficient, continuous, uninterrupted operation of the treating process is assured. Halogen and/or sulfur obtained from the spent catalyst is recovered as by-product or passed directly to a separate process employing it as a charge material.

When the catalysts become exhausted to a point where efficient impurity removal is no longer obtained, they are subjected to a more drastic regeneration. Such more acute catalyst exhaustion, not completely remedied by mere steaming or gas blowing, is obtained particularly when effecting the removal of organically combined halogen, such as organically combined chlorine, from the hydrocarbons undergoing treatment. Such exhaustion of the catalyst may well be due to interaction of decomposition products of organically combined halogen compounds, such as, for example, hydrogen halide, or free halogen, with the alkali or alkaline earth metal of the alkaline compound in the catalyst to result in the formation of a halide salt of the alkali or alkaline earth metal. Regeneration of the exhausted catalyst is readily brought about by washing the spent catalyst with water, thereby effecting the removal of at least a substantial part of the resulting halide salts, and thereafter combining fresh alkaline alkali or alkaline earth compounds with the washed carbon.

A particular advantage of the invention resides in the ability to produce a product containing no substantial amounts of hydrogen halide and/or hydrogen sulfide, thereby obviating the need for subsequent washing of the treated hydrocarbons. A further advantage resides in the ability to effect the removal of the impurities without recourse to the use of water or steam during the purifying operation, thereby obviating the need for separation of water from the treated product or subjection of the product to a dehydration step. After prolonged periods of operation when the catalyst begins to lose its ability to retain substantially completely the sulfur- and/or halogen-containing products resulting from decomposition of the contaminants, an after-treatment of the hydrocarbons to effect the removal of remaining minor amounts of impurities, such as hydrogen sulfide, by means of a treatment with aqueous caustic solutions, with an organic amine or a solid adsorbent, etc. may be resorted to.

The following examples are illustrative of the invention:

*Example I*

A catalyst consisting of active carbon in combination with potassium hydroxide, suitable for use in the process of the invention, was prepared by adding 74 cc. of aqueous potassium hydroxide solution containing 342.7 mg. of potassium per cc. of solution, to 500 cc. (253.5 grams) of active carbon (3 to 5 mm.). The resulting sticky mass was dried at a temperature of 120° C. for 1½ hours. Before use in the process the resulting catalyst was subjected to a further heating in a nitrogen atmosphere at the temperature subsequently employed in the purification of hydrocarbons therewith.

Example II

An Iraq straight run gasoline having a sulfur content of 0.14 per cent which could not be reduced to any noticeable extent by treatment with alkali, was contacted with a catalyst consisting of active carbon in combination with potassium hydroxide at a temperature of 350° C. and a throughput rate of 0.2 kg. of gasoline per liter of catalyst per hour. Hydrogen in an amount equal to 25 liters of hydrogen per kg. of gasoline was admixed with the gasoline charge. The catalyst employed contained an amount of potassium, in the form of potassium hydroxide, equivalent to 10 per cent by weight of the active carbon present. The treated gasoline obtained after 12 hours of continuous operation was found to contain only 0.007 per cent of sulfur. Treated gasoline obtained after 39 hours of continuous operation was found to contain 0.02 per cent of sulfur.

Example III

A straight run Iraq gasoline having a sulfur content of 0.1 per cent which could not be reduced to any noticeable extent by treatment with alkali was passed over a catalyst consisting of active carbon in combination with potassium hydroxide at a temperature of 400° C. and a throughput rate of 0.2 kg. of gasoline per liter of catalyst per hour. The catalyst employed contained an amount of potassium, in the form of potassium hydroxide, equal to 10 per cent by weight of the active carbon present in the catalyst. After 6 hours of continuous operation the sulfur content of the refined gasoline obtained was only 0.005 per cent.

Example IV

A straight run Iraq gasoline having a sulfur content of 0.1 per cent which could not be reduced to any noticeable extent by treatment with alkali, was contacted with a catalyst consisting of active carbon in combination with potassium hydroxide at a temperature of 375° C. and a throughput rate of 0.2 kg. of gasoline per liter of catalyst per hour. The catalyst employed contained an amount of potassium, in the form of potassium hydroxide, equal to 10 per cent by weight of the active carbon present in the catalyst. The refined gasoline obtained after six hours of continuous operation had a sulfur content of 0.019 per cent.

Example V

A straight run Iraq gasoline having a sulfur content of 0.1 per cent which could not be reduced to any noticeable extent by treatment with alkali, was contacted with a catalyst consisting of active carbon in combination with sodium carbonate at a temperature of 375° C. and a throughput rate of 0.2 kg. of gasoline per liter of catalyst per hour. The catalyst employed contained an amount of sodium, in the form of sodium carbonate, equal to 10 per cent by weight of the active carbon present in the catalyst. The refined product obtained after six hours of continuous operation was found to have a sulfur content of 0.03 per cent.

Example VI

A straight run Iraq gasoline having a sulfur content of 0.1 per cent which could not be reduced to any noticeable extent by treatment with alkali, was contacted with a catalyst consisting of active carbon in combination with calcium hydroxide at a temperature of 375° C. and a throughput rate of 0.2 kg. of gasoline per liter of catalyst per hour. The catalyst employed contained an amount of calcium, in the form of calcium hydroxide, equal to 10 per cent by weight of the active carbon present in the catalyst. The refined gasoline obtained after six hours of continuous operation had a sulfur content of 0.025 per cent.

Example VII

Iraq straight run gasoline having a sulfur content of 0.1 per cent taken from the same source as that employed as charge in the operations of foregoing Examples IV, V and VI was contacted with active carbon at a temperature of 375° C. and at a throughput rate of 0.2 kg. of the gasoline per liter of catalyst per hour. The active carbon employed was of the same source as that employed as the active carbon component of the combinations of catalysts used in Examples IV, V and VI. In the present operation, however, the active carbon was used as such without the addition thereto of any alkaline compound whatsoever for comparative purposes. The treated gasoline obtained after six hours of continuous operation was found to have a sulfur content of 0.07 per cent.

Example VIII

A Lagunillas straight run gasoline containing no perceptible amount of sulfur, but having a chlorine content of 0.021% (in the form of monochlorobenzene) was contacted with a catalyst consisting of active carbon in combination with potassium hydroxide at a temperature of 400° C. and a throughput rate of 0.2 kg. of gasoline per liter of catalyst per hour. The catalyst employed contained an amount of potassium, in the form of potassium hydroxide, equal to 10 per cent by weight of the active carbon present. The chlorine content of the product after 10 hours of continuous operation was found to be less than 0.001%. Treatment of a portion of the gasoline charge with a 10% caustic soda solution, at a temperature of 70° C. failed to effect any noticeable reduction in the chlorine content.

The invention claimed is:

1. The process of removing organically combined chlorine from hydrocarbons which comprises contacting said hydrocarbons at a temperature of from about 350° C. to about 425° C. and under substantially anhydrous conditions with a catalyst consisting essentially of active carbon in combination with potassium hydroxide, thereby retaining said chlorine in said catalyst and recovering said hydrocarbons free of any substantial amount of chlorine.

2. The process of removing organically combined chlorine from hydrocarbons which comprises contacting said hydrocarbons at a temperature of from about 250° C. to about 475° C. and under substantially anhydrous conditions with a catalyst consisting essentially of active carbon in combination with an alkali metal hydroxide, thereby retaining said chlorine in said catalyst and recovering said hydrocarbons free of any substantial amount of chlorine.

3. The process of removing organically combined chlorine from hydrocarbons which comprises contacting said hydrocarbons at a temperature of from about 250° C. to about 475° C. and under substantially anhydrous conditions with a catalyst consisting essentially of active carbon in combination with an alkaline compound of an alkali metal, thereby retaining said chlorine in said catalyst and recovering said hydrocarbons free of any substantial amount of chlorine.

4. The process of removing organically combined chlorine from hydrocarbons which comprises contacting said hydrocarbons at a temperature of from about 250° C. to about 475° C. and under substantially anhydrous conditions with a catalyst consisting essentially of active carbon in combination with an alkaline compound of alkaline earth metal, thereby retaining said chlorine in said catalyst and recovering said hydrocarbons free of any substantial amount of chlorine.

5. The process of removing organically combined chlorine from hydrocarbons which comprises contacting said hydrocarbons at a temperature of from about 250° C. to about 475° C. and under substantially anhydrous conditions with a catalyst consisting essentially of active carbon in combination with an alkaline compound of a metal of the group consisting of the alkali and alkaline earth metals, thereby retaining said chlorine in said catalyst and recovering said hydrocarbons free of any substantial amount of chlorine.

6. The process of removing halogen impurities from hydrocarbons which comprises contacting said hydrocarbons at a temperature of from about 250° C. to about 475° C. and under substantially anhydrous conditions with a catalyst consisting essentially of active carbon in combination with an alkaline compound of a metal of the group consisting of alkali and alkaline earth metals, thereby retaining said halogen impurities in said catalyst and recovering said hydrocarbons free of any substantial amount of said halogen impurities.

7. The process of removing halogen impurities from hydrocarbons which comprises contacting said hydrocarbons at a temperature above about 250° C., but below the temperature at which any substantial alteration in composition of said hydrocarbons due to decomposition thereof is brought about, with a catalyst consisting essentially of active carbon in combination with an alkaline compound of a metal of the group consisting of alkali and alkaline earth metals, thereby retaining said halogen impurities in said catalyst and recovering said hydrocarbons free of any substantial amount of said halogen impurities.

WILLEM FREDERIK ENGEL.

REFERENCES CITED

The following references are of record in the file of this patent:

UNITED STATES PATENTS

| Number | Name | Date |
|---|---|---|
| 88,978 | Parsons | Apr. 13, 1869 |
| 2,272,594 | Bender | Feb. 10, 1942 |
| 2,379,654 | Royer | July 3, 1945 |
| 2,413,871 | Hepp | Jan. 7, 1947 |